(12) United States Patent
de Jong et al.

(10) Patent No.: US 7,703,990 B1
(45) Date of Patent: Apr. 27, 2010

(54) FURCATION BODIES AND FIBER OPTIC ASSEMBLIES USING THE SAME

(75) Inventors: Michael de Jong, Colleyville, TX (US); Paul X. Devereaux, Dallas, TX (US); Chanh C. Vo, Keller, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 12/429,008

(22) Filed: Apr. 23, 2009

(51) Int. Cl.
    *G02B 6/36* (2006.01)
(52) U.S. Cl. .................... 385/87; 385/76; 385/77; 385/83; 385/84; 385/100; 385/136; 385/137
(58) Field of Classification Search .............. 385/100, 385/102, 103, 104, 105, 106, 107, 108, 109, 385/110, 111, 112, 113, 136, 137, 138, 134, 385/135, 53, 55, 56, 60, 69, 76, 77, 78, 80, 385/81, 83, 84, 86, 87
    See application file for complete search history.

(56) References Cited

U.S. PATENT DOCUMENTS

| | | | |
|---|---|---|---|
| 5,473,718 A | 12/1995 | Sommer | 385/87 |
| 5,838,861 A | 11/1998 | Bunde | 385/100 |
| 5,903,693 A | 5/1999 | Brown | 385/100 |
| 5,966,489 A | 10/1999 | Harwell et al. | 385/114 |
| 5,970,195 A | 10/1999 | Brown | 385/100 |
| 6,278,831 B1 | 8/2001 | Henderson et al. | 385/139 |
| 6,389,214 B1 | 5/2002 | Smith et al. | 385/136 |
| 6,438,299 B1 | 8/2002 | Brown et al. | 385/100 |
| 6,738,555 B1 | 5/2004 | Cooke et al. | 385/136 |
| 6,764,221 B1 | 7/2004 | de Jong et al. | 385/55 |
| 6,771,861 B2 | 8/2004 | Wagner et al. | 385/100 |
| 6,909,828 B2 | 6/2005 | Zimmel et al. | 385/100 |
| 6,993,237 B2 | 1/2006 | Cooke et al. | 385/135 |
| 7,035,510 B2 | 4/2006 | Zimmel et al. | 385/100 |
| 7,200,316 B2 | 4/2007 | Giraud et al. | 385/135 |
| 7,270,485 B1 | 9/2007 | Robinson et al. | 385/55 |
| 7,277,614 B2 | 10/2007 | Cody et al. | 385/100 |
| 7,280,725 B2 | 10/2007 | Brown et al. | 385/100 |
| 7,330,629 B2 | 2/2008 | Cooke et al. | 385/136 |
| 7,461,981 B2 | 12/2008 | Yow, Jr. et al. | 385/76 |
| 7,492,997 B2 | 2/2009 | Bell et al. | 385/114 |
| 7,494,284 B2 | 2/2009 | Robinson et al. | 385/53 |
| 7,512,308 B2 | 3/2009 | Barnes et al. | 385/139 |
| 2005/0084221 A1* | 4/2005 | Yang et al. | 385/114 |

* cited by examiner

*Primary Examiner*—Brian M Healy
(74) *Attorney, Agent, or Firm*—Michael E. Carroll, Jr.

(57) ABSTRACT

Furcation bodies and furcation assemblies are disclosed. In one embodiment, a furcation body includes a channel forming a passageway extending from the front end to a back end of the furcation body. The furcation body may accommodate different styles and/or sizes of fiber optic cables. For instance, the furcation body may be secured to either a buffer tube of a buffered drop cable or a cable jacket of an unbuffered drop cable. Additionally, assemblies may include a furcation tube secured to the furcation member back end for protecting the optical fiber extending from the furcation body and/or a fiber optic connector. Furcation assemblies having multiple fibers are also disclosed.

28 Claims, 11 Drawing Sheets

FURCATION BODIES AND FIBER OPTIC ASSEMBLIES USING THE SAME

BACKGROUND

1. Field

The present disclosure relates generally to furcation bodies for fiber optic cables. More specifically, the disclosure relates to furcation bodies, associated fiber optic cable assemblies having furcation bodies along with methods therefor.

2. Technical Background

Fiber optic communications has experienced explosive growth. In just a few years, the transmission of communication signals for voice, video, data, and the like has soared. Moreover, future growth is planned as fiber optic communication technology improves and networks expand to provide greater access to subscribers.

Fiber optic cables are the backbone of fiber optic communication systems. Fiber optic cables carry optical fibers and other cable elements, which are protected from the external environment by a cable jacket. However, there are several different types of fiber optic cables available for routing optical fibers toward the subscriber. The optical fibers of the fiber optic cable may be surrounded by strength members and protective elements, and may be loosely disposed within tubes ("buffer tubes").

Optical fiber cables that carry optical signals to a home or other locations from a connection point on the distribution cable in so-called "fiber-to-the-X" (FTTX) networks are referred to in the art as "drop cables." At the end of a drop cable, the fibers are extracted from the cable and inserted into fiber optic connection devices, such as connectors or splices, thereby forming a connection point on the end of the fiber optic cable. This process is referred to in the art as "furcation." The furcation process must be performed with great care and precision in order to preserve optical performance. Performing the furcation process can take a great deal of time because each optical fiber in a drop cable is usually manually routed and/or furcated and then individually connected to other optical fibers. A furcation body or furcation assembly thus serves to organize the loose fibers and to protect the completed connections, while also allowing individual optical fibers to be easily handled, connectorized, spliced, or the like. The furcation assembly also prevents degradation of the prepared fibers and protects the fiber ends from moisture, dust, and other contaminants.

Furcating drop cables is required because the desired connectors may not be designed to be installed on large, rigid, outdoor-rated drop cables. Products are currently available to furcate a drop cable, or transition it into a small unprotected tube. While these products provide some protection for the coated fiber as it enters the connector, the transition from the drop cable to the tube (which typically has 1 millimeter outside diameter (OD)) is not particularly robust. Moreover, the assembly can be cumbersome and/or time-consuming to assemble in the field. Thus, a need therefore exists for improved fiber optic cable furcation assemblies and methods.

SUMMARY

The present disclosure is directed to a furcation body and furcation assemblies for furcating a fiber optic cable. The furcation body includes a channel forming a passageway extending from a front end to a back end of the furcation body. The furcation body also has one or more attachment grooves suitable for securing the furcation body to a portion of the fiber optic cable and the back section of channel sized for receiving a furcation tube. The furcation body may be attached to the fiber optic cable quickly and easily without the use of tools, adhesive, or the like while still providing a robust structure. However, the craft may optionally crimp and/or use an adhesive to attach the furcation body to the fiber optic cable.

Additional features and advantages are set forth in the detailed description that follows, and in part will be readily apparent to those skilled in the art from that description or recognized by practicing the concepts described herein, including the detailed description that follows, the claims, and the appended drawings. It is to be understood that both the foregoing general description and the following detailed description present exemplary embodiments, and are intended to provide an overview or framework for understanding the nature and character of the invention as it is claimed. The accompanying drawings are included to provide a further understanding of the concepts, and are incorporated into and constitute a part of this specification. The drawings illustrate various embodiments, and together with the detailed description, serve to explain the principles and operations thereof.

BRIEF DESCRIPTION OF THE DRAWINGS

These and other features, aspects and advantages are better understood when the following detailed description is read with reference to the accompanying drawings, in which.

DETAILED DESCRIPTION

Reference is now made to preferred embodiments, examples of which are illustrated in the accompanying drawings. Whenever possible, the same or similar reference numbers and symbols are used throughout the drawings to refer to the same or similar parts.

Figure 1:
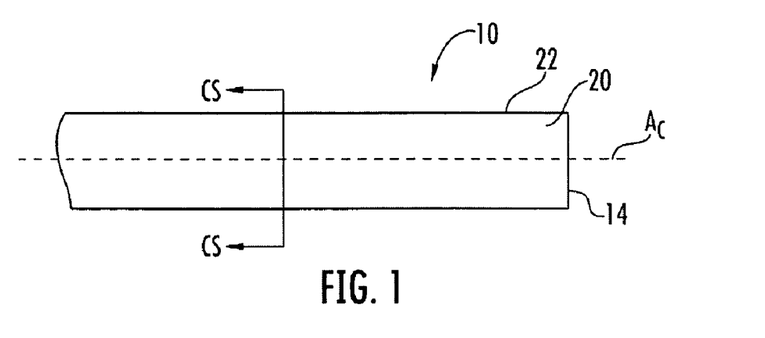
FIG. 1 is a schematic side view of a generic fiber optic drop cable.

FIG. 1 is a schematic side view of a generic fiber optic drop cable ("drop cable") 10 of the type that is portion of the furcation assemblies as described below. Drop cable 10 includes an end 14, a central axis $A_C$, and a cable jacket 20 that defines an outer surface 22 of the fiber optic cable. In an example embodiment, cable jacket 20 is made from polyethylene (PE), but other suitable polymers and/or blends of polymers are possible. Moreover, cable jacket 20 can have any suitable shape and/or size for use with the furcation bodies disclosed.

While a various types of fiber optic drop cables 10 exist, they can be divided into two main categories: buffered and unbuffered. A buffered fiber optic drop cable carries at least one optical fiber in a buffer tube with the fiber loosely arranged therein and typically surrounded by a protective gel. An unbuffered fiber optic drop cable carries at least one optical fiber directly in the cable jacket, i.e., the cable jacket immediately surrounds the optical fiber. An example of a buffered drop cable is an SST-type drop cable, while an example of an unbuffered drop cable is an ROC-type drop cable, both of which are available from Corning Cable Systems of Hickory, N.C. Furcation bodies disclosed herein are advantageous since they furcate either of the two main types of drop cables.

Figure 2:
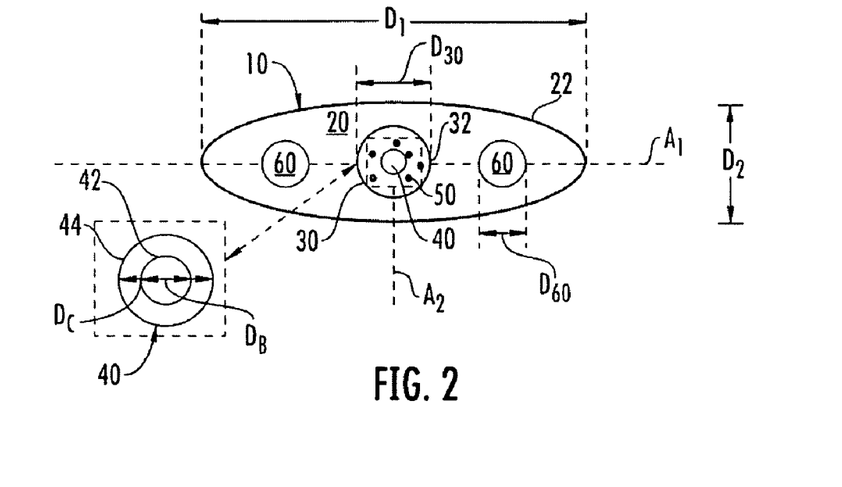
FIG. 2 is a cross-sectional view of the drop cable of FIG. 1 as viewed along the direction CS and illustrating an example embodiment of a buffered drop cable.

FIG. 2 is a cross-section of drop cable 10 of FIG. 1 as viewed in the direction CS, illustrating the basic features of a buffered drop cable such as the aforementioned SST-type drop cable. Buffered drop fiber optic cable 10 has an elongate cross-sectional shape with a major axis $A_1$ and a minor axis $A_2$. Buffered fiber optic drop cable 10 also includes a buffer tube 30 that runs along central axis $A_C$ within cable jacket 20 and defines an interior 32. One or more optical fiber(s) 40 are loosely carried in buffer tube interior 32. A protective gel 50 is also typically contained in buffer tube interior 32 for water-blocking. Buffered drop cable 10 also includes flexible strength members 60 arranged within cable jacket 20 along major axis $A_1$ on either side of buffer tube 30 and that run substantially parallel to central axis $A_C$. In an example embodiment, strength members 60 are formed from glass reinforced plastic (GRP), but other suitable strength members are possible.

As illustrated in the inset of FIG. 2, fiber 40 includes a "bare" inner portion 42 of diameter $D_B$ that includes the core and cladding of the fiber (the core and cladding are not individually shown) and that is surrounded by a coating 44 of diameter $D_C$. In an example embodiment, $D_B$=125 µm (nominal) and $D_C$=250 µm (nominal), but other sizes are possible. Buffer tube 30 has a suitable size for the number optical fibers. For example, buffer tube 30 may have an outside diameter (OD) $D_{30}$ of about 3 millimeters and an inside diameter (ID) $D'_{30}$ of about 1.5 millimeter. Also in an example embodiment, strength members 60 have a diameter $D_{60}$ of about 1.75 millimeters, but other sizes are possible. By way of example embodiment, buffered drop cable 10 has a major-axis diameter $D_1$ of about 8.15 millimeters and a minor-axis diameter $D_2$ of about 4.4 millimeters. Of course, other size and/or construction variations are possible.

Figure 3:
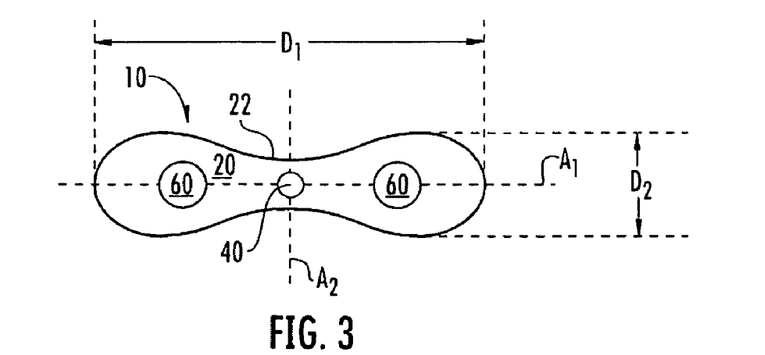
FIG. 3 is a cross-sectional view of the drop cable of FIG. 1 as viewed along the direction CS and illustrating an example embodiment of an unbuffered drop cable.

FIG. 3 is a cross-sectional view showing the basic features of an unbuffered drop cable 10, which is similar to the fiber optic drop cable of FIG. 2. One such unbuffered fiber optic drop cable is available under the tradename ROC drop cable from Corning Cable Systems. Unbuffered drop fiber optic cable 10 is similar to a buffered drop cable in that also has an elongate cross-sectional shape with major and minor axes $A_1$ an $A_2$ and similarly arranged strength members 60. In an example embodiment, the unbuffered drop cable cross-section has a dogbone shape rather than an oval shape or flat shape. However, unbuffered drop fiber optic cable 10 does not include buffer tube 30. Rather, fiber 40 runs substantially along central axis $A_C$ and is surrounded and held directly by cable jacket 20. In one example embodiment, unbuffered drop cable 10 has a major-axis diameter $D_1$ of about 5.4 millimeters and a minor-axis diameter $D_2$ of about 3.0 millimeters, and strength members 60 have a diameter $D_{60}$ of about 1.5 millimeters. Fiber 40 is the same as that described above. However, the fiber optic drop cables may include any suitable optical fibers such as uncolored optical fibers, or optical fibers which for further preparation and termination have been colored with for example with a permanent ink marker.

Thus, fiber optic drop cables can have different dimensions and/or constructions which can cause difficulty when the craft wishes to connectorize fiber optic drop cables in the field. Furcation bodies disclosed herein are advantageous since they can accommodate different sized and/or constructions of fiber optic cables as will be discussed below. Moreover, the furcation bodies disclosed can be attached to the fiber optic cable without the use of an adhesive or crimp while still providing a robust assembly.

Figure 4:
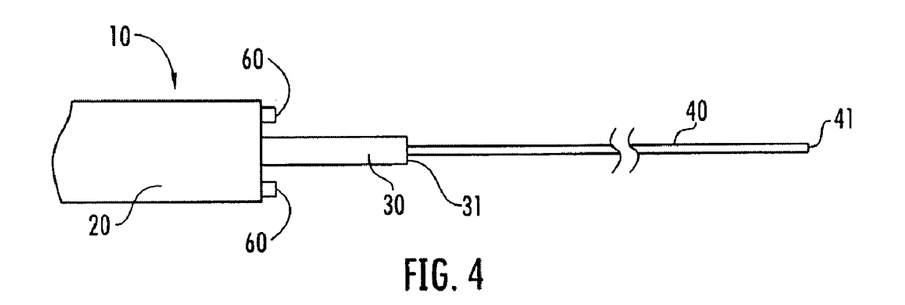
FIG. 4 is a close-up side view of an end portion of a buffered drop cable illustrating how the cable is stripped to expose the buffer tube and the optical fiber, and also showing the cut-back support members.

A first example embodiment of a furcation assembly, and method of forming the assembly, is described in connection with a buffered drop cable 10 such as described in FIG. 2. With reference to FIG. 4, an end-portion of buffered drop cable 10 is stripped to expose a suitable length of buffer tube 30 such as about 3.5 centimeters having an end 31. Also exposed is a suitable length of fiber 40 extending beyond buffer tube 30 such as about 120 centimeters of coated fiber 40 having an end 41. Of course, other suitable lengths for the buffer tube and the fiber are possible. Any gel or grease is cleaned from fiber 40, and strength members 60 are cut back approximately to the cable jacket 20.

Figure 5A:
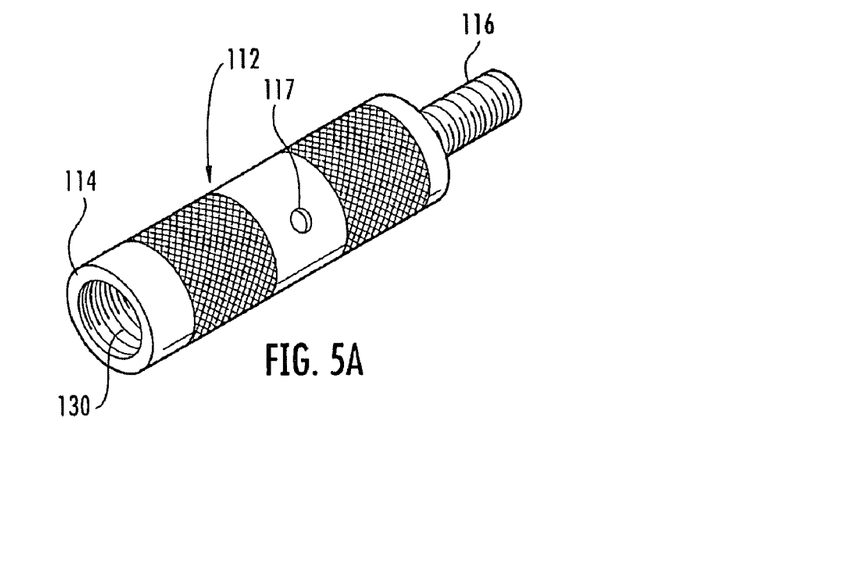
FIG. 5A is a perspective view of an explanatory furcation body.
Figure 5B:
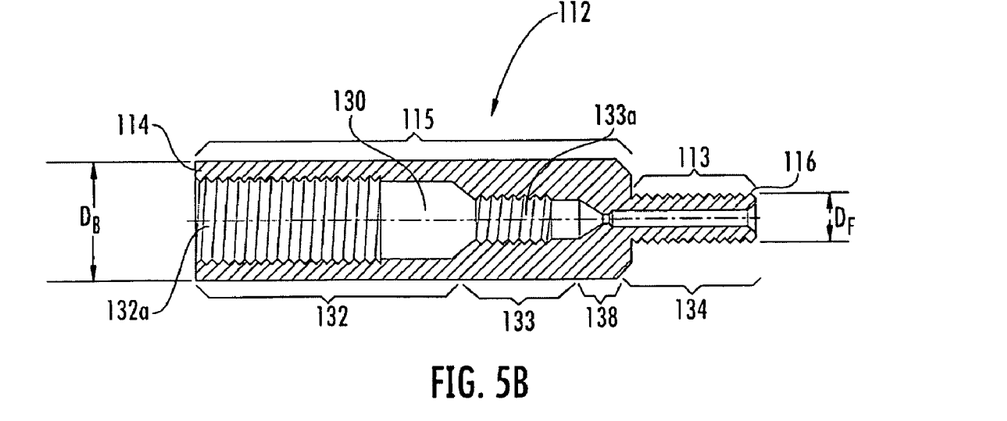
FIG. 5B is a lengthwise cross-sectional view of the furcation body of FIG. 5A.
Figure 6:
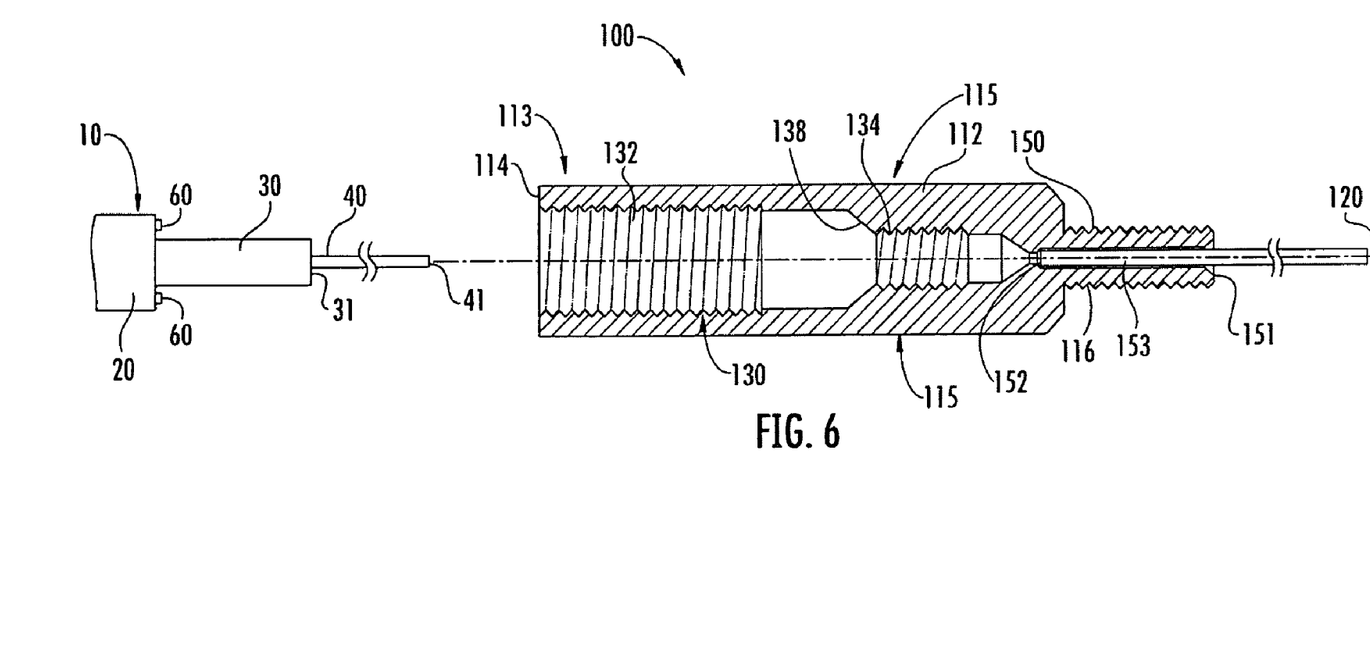
FIG. 6 is a close-up side view of the stripped buffered drop cable, along with the furcation body prior to the cable being attached to the same.

FIG. 5A and FIG. 5B depict an explanatory furcation body 112 having a front end 114 and a back end 116, and a centerline 120 (FIG. 6). Although furcation body 112 is depicted as generally cylindrical, it can have other shapes. member that includes an elongate (e.g., a generally cylindrical) Furcation body 112 defines a channel 130 forming a passageway extending from the front end 114 to the back end 116 of furcation body 112. Channel 130 includes a front section 132 having one or more attachment grooves 132a therein for securing a fiber optic cable to furcation body 112. As used herein, attachment grooves means annular or helical threads in any direction, ridges, grooves or other suitable profiled features disposed in the channel for creating a mechanical attachment with the fiber optic cable. Furcation body 112 can also include multiple sections having attachment grooves. As best shown in FIG. 5B, channel 130 of furcation body 112 includes a medial section 133 that also includes one or more attachment grooves 133a therein for securing a portion of a fiber optic cable. The medial section 133 has a smaller inner dimension that the front section 132, thereby allowing the attachment of a different size and/or construction of cable to furcation body 112. For instance, the medial section 133 may be sized to attach the buffer tube of the fiber optic cable thereto. Thus, furcation body 112 can accommodate fiber optic cables having buffer tubes by receiving a portion of the buffer tube within the medial section and having a larger portion of the fiber optic cable with the strength members and/or cable jacket within the front section 132. In another embodiment, a fiber optic cable without a buffer tube can be attached to either the front section 132 or the medial section 133, which ever section has the closest fit for the fiber optic cable. In other words, if the fiber optic cable is too small for the front section 132 of the channel 130 it can be further inserted to the medial section 133 of furcation body 112 where it can engage the attachment grooves therein. Thus, the furcation bodies and assemblies disclosed herein are useful with several different types and/or sizes of fiber optic cables.

Channel 130 also includes a back section 134 sized to accommodate a furcation tube 150. In other variations, the back section 134 of the furcation body 112 can allow for the buffer tube of the cable to extend therethrough, but the embodiment illustrated includes a neck-down portion 138 that serves as a transition zone between the medial section 133 of channel 130 and back section 134 of channel 130. When inserting a fiber optic cable the stepped portion 138 centers and guides the optical fiber so it passes through and extends beyond the furcation body. Furcation body 112 is manufactured from any suitable material such as a metal like brass, stainless steel, or aluminum, or may be formed from a suitable polymer with sufficient strength for the attachment grooves. Moreover, any suitable process such as molding, machining, casting, etc is possible, but some manufacturing processes may be easier for a given design.

By way of example, furcation body 112 has a length of about 40 millimeters, but other lengths are possible. In an example embodiment, furcation body has a circular cross section and includes a front portion 113 having a diameter $D_F$ and a rear portion 115 have a diameter $D_B$, wherein $D_F > D_B$. In an example embodiment, front portion 113 is about 30 millimeters long and rear portion 115 is about 8 millimeters long. As shown, back section 115 of furcation body 112 may include a portion having an external threaded portion for assisting in attaching a bend-limiting boot 240 to the furcation body or an extension thereto (see FIG. 10A above the assembly). Furcation body 112 may also include one or more gripping surfaces such as knurling (not numbered) or like on an outer surface for gripping the same by the craft so that the furcation body can be attached to the cable by twisting and/or pushing. Thus, a generally round furcation body is disposed on a non-round cable without the need for an adhesive or crimp. This is advantageous for the craft since no tools and/or materials are needed for attaching the furcation body to the fiber optic cable.

Of course, if desired by the craft, the furcation body may be crimped to the fiber optic cable or use an adhesive to attach the same, but it is not necessary. In other words, the furcation assembly (i.e., the furcation body attached to the fiber optic cable) can withstand a substantial pullout force without crimping or adhesive. By way of example, the furcation assembly can withstand a pullout force of about 50 Newtons or more, and preferably about 75 Newtons, between the fiber optic cable and furcation body without the use of an adhesive or crimp. Other pullout force values are also possible for furcation assemblies. In addition, the furcation bodies disclosed may also include a sealing feature. For example, the furcation body may have at least one sealant material therein, for example, silicone room temperature vulcanizing sealant integrated within the furcation member, or rubber splicing tape for example commercially available B tape. The sealing feature closes the gaps between the furcation member and adjacent components of the fiber optic cable. In further embodiments, the sealing feature may be injected into the furcation body using one or more bores 117 that lead to the channel. Likewise, the bores may be used for injecting an adhesive or the like, if desired by the craft.

As shown in FIG. 6, furcation assembly 100 further includes a furcation tube 150 having a back end 151 and a front end 152. Furcation tube 150 is attached (e.g., glued, crimped, or the like) to back section 134 of channel 130. Thus, back section 134 is appropriately sized for receiving and attaching furcation tube 150 thereto. In one embodiment, furcation tube 150 has an OD of about 1 millimeter and an ID of about 0.4 millimeters, and has a suitable length such as about 90 centimeters long. Of course, other lengths and furcation tube sizes are possible with the concepts disclosed. Furcation tube 150 is made of a suitable material such as polyvinyl chloride (PVC), Teflon tubing, or the like and has sufficient strength to inhibit buckling and the like during bending, etc. In still further embodiments, the furcation bodies have several furcation tubes 150 attached thereto.

Figure 7:
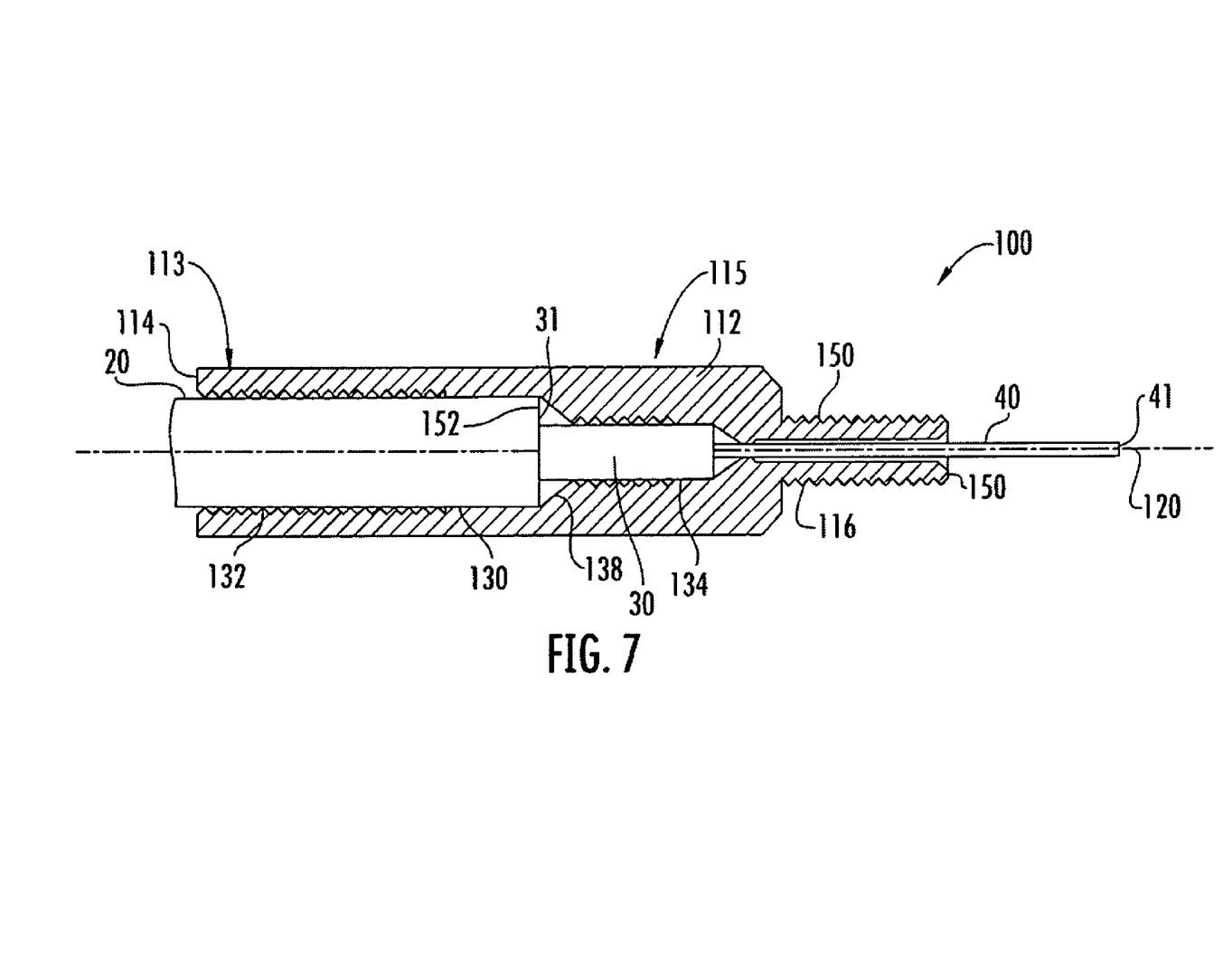
FIG. 7 is a partial cross-sectional side view of the fiber optic cable attached to the furcation body.

FIG. 7 depicts a partial cross-sectional view showing the prepared buffered fiber optic cable 10 inserted into furcation body 112 so that fiber 40 extends through channel back section 134 and through furcation tube 150 so as to extend beyond end 151 by a suitable distance such as about 30 centimeters. Neckdown portion 138 and the relatively large ID of furcation tube 150 as compared to the diameter $D_B$ of fiber 40 make this an easy operation. The furcation body is pushed and/or twisted onto exposed buffer tube 30 until buffer tube end 31 generally abuts neckdown portion 138 so that an end portion of the buffer tube resides in medial section 133 of the furcation body 112. For instance, if attachment grooves are helical threads, then twisting the furcation body 112 relative to the fiber optic cable advances and attaches the furcation body to the cable. In other preparation techniques, different sized fiber optic cables are sized and/or shaped for fitting into the furcation body. For instance, side portions of the fiber optic cable are removed using a tool such as a utility knife to make attaching a fiber optic cable easier and/or to expose strength members.

Figure 8:
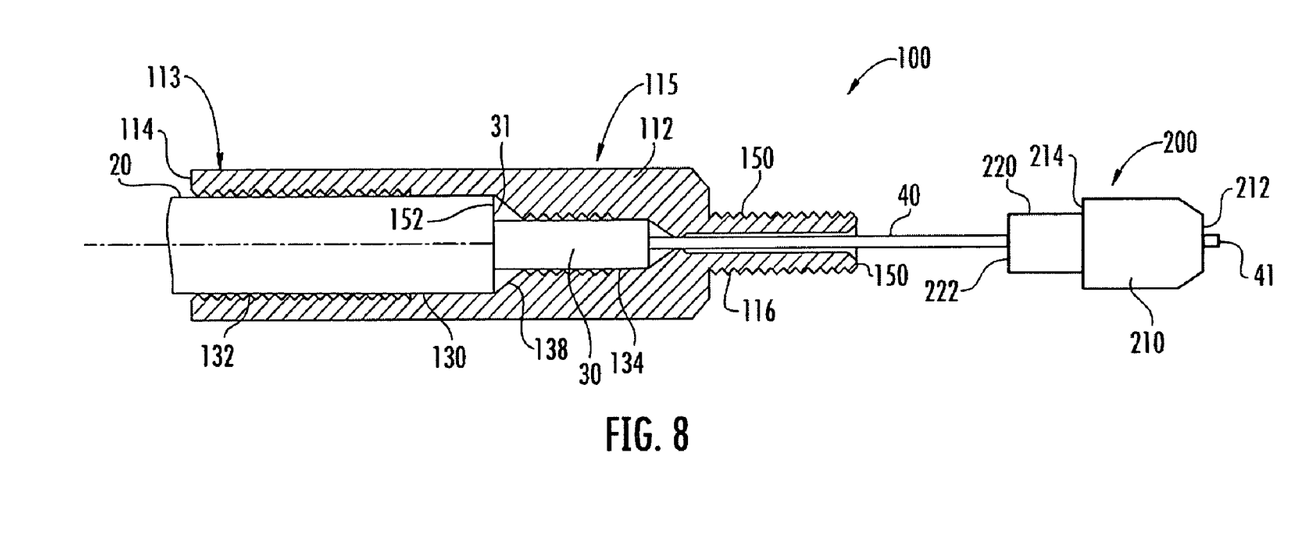
FIG. 8 is a schematic view of the furcation assembly having a fiber optic connector attached thereto.

As shown in FIG. 8, fiber 40 extends beyond furcation tube 150 with a given length for attaching a suitable fiber optic connector. As known in the art, fiber 40 is prepared (e.g., stripped and cleaved) for installation (i.e., "connectorization") into an optical fiber connector 200, such as an OPTI-SNAP or UNICAM connector available from Corning Cable Systems, LLC, of Hickory, N.C. In this embodiment, connector 200 includes a connector housing 210 having a front end 212 and a back end 214, and a crimpable lead-in tube 220 that extends from the connector housing back end. Prior to attaching connector 200, a bend-limiting connector boot 240 may be slid over furcation tube 150 in anticipation of connecting the boot to connector housing back end 214. At this point, fiber 40 is connectorized with a connector 200, thereby forming a cable assembly.

Figure 9:
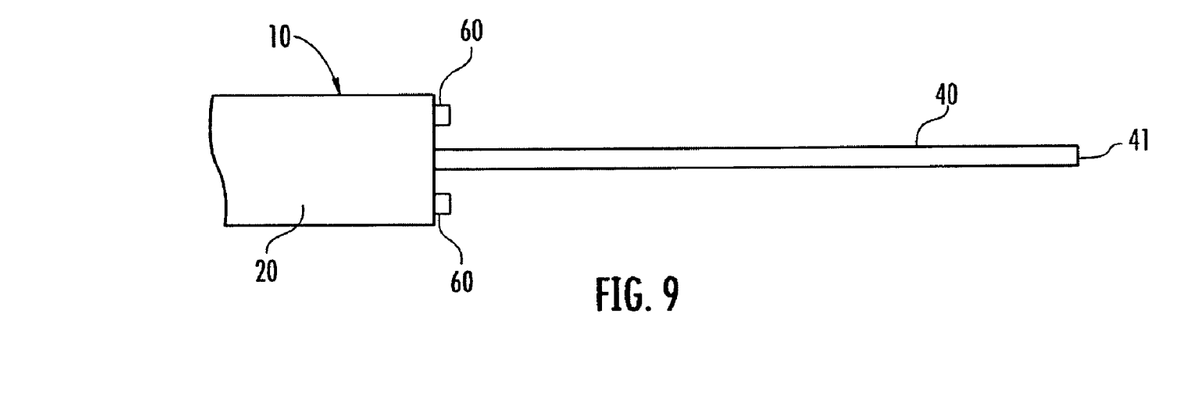
FIG. 9 is a plan view of an end portion of an unbuffered fiber optic drop cable prepared for attaching to the furcation body.
Figure 10A:
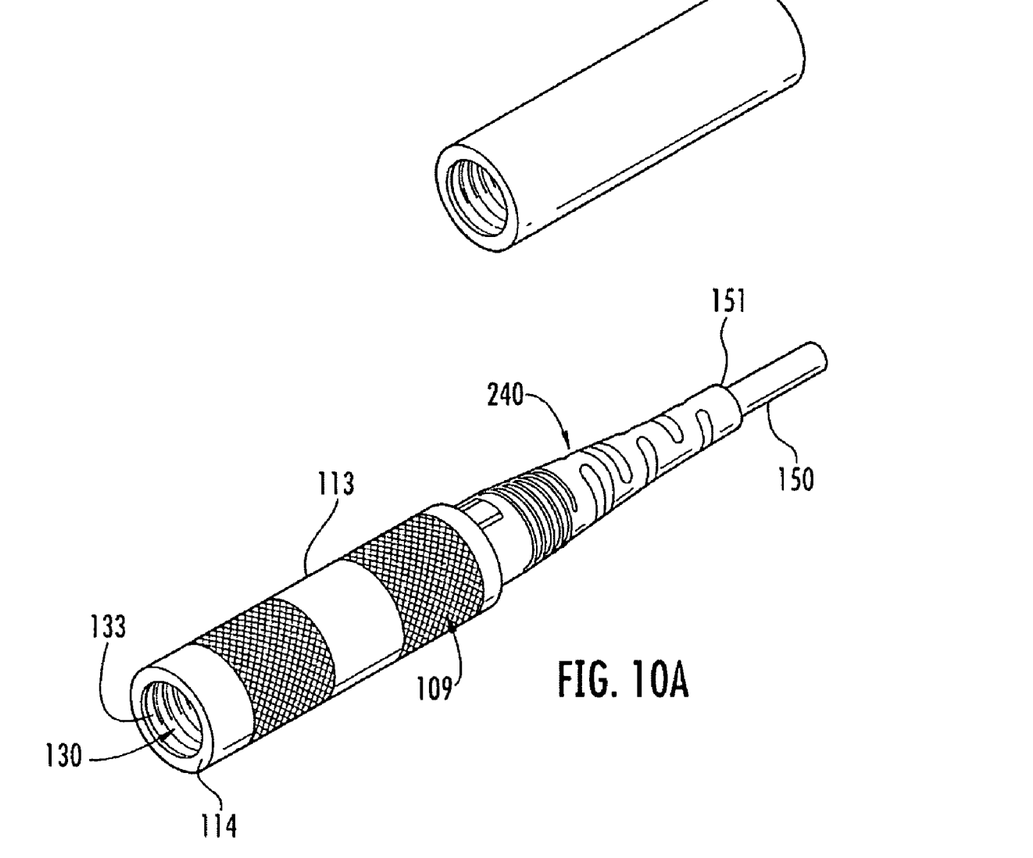
FIG. 10A is a perspective view of a portion of the furcation assembly having the furcation tube and a bend-limiting boot attached.
Figure 10B:
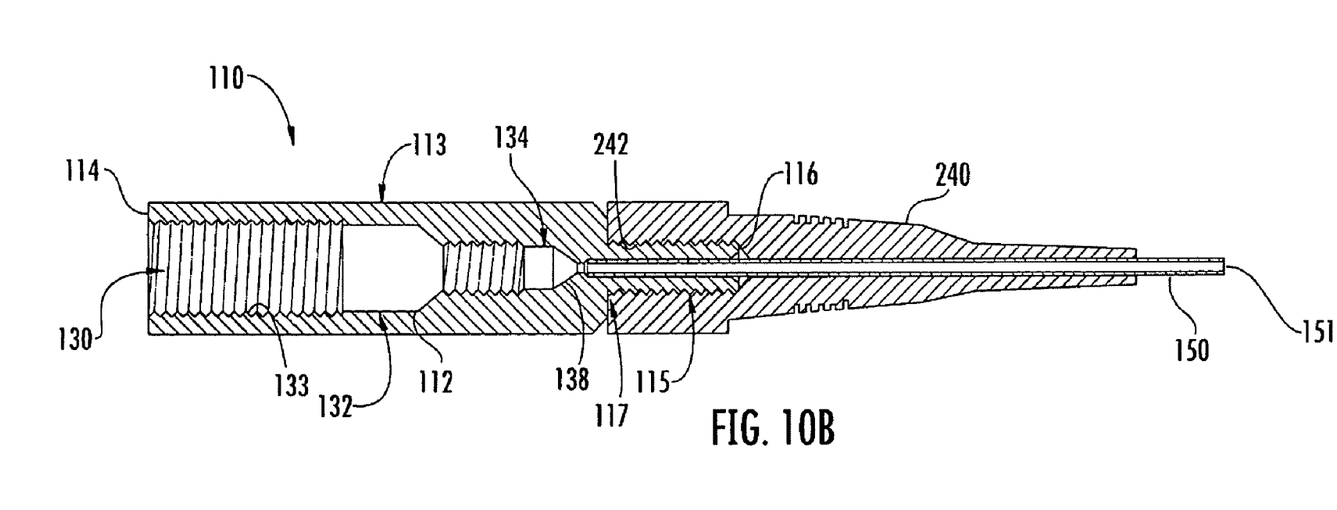
FIG. 10B is a lengthwise cross-sectional view of the furcation assembly of FIG. 10A.

Furcation assembly 100 and method of forming the furcation assembly using the unbuffered fiber optic drop cable 10 such as shown in FIG. 3, is now described. FIG. 9 shows an end-portion of unbuffered drop cable 10 stripped to expose a suitable length of fiber such as about 120 centimeters of fiber 40 having an end 41. Strength members 60 are also cut back close to cable jacket 20. As with the other furcation assembly, the furcation assembly 100 further includes a furcation tube 150 attached to furcation body 112 as shown in FIGS. 10A and 10B. Furcation tube 150 includes a back end 151, a front end 152, and defines a guide channel 153 therethrough. In one embodiment, furcation tube 150 has an outer diameter (OD) of about 1 millimeter and an inner diameter (ID) of about 0.4 millimeters, and has a suitable length such as about 90 centimeters, but other suitable geometry is possible. Like the other assembly, a portion of furcation tube 150 resides in back section 134 of channel 150 and extends therefrom. Furcation tube 150 is attached to furcation body 112 in any suitable fashion and the bend-limiting boot 240 may be attached to the furcation body to inhibit furcation tube 150 from kinking or otherwise bending too severely near the furcation body. Boot 240 may includes a lip 242 or other suitable structure that engages circumferential indent 117 in attaching to furcation body 112. Alternatively, a metal extension tube (FIG. 10A; not numbered) may be threaded onto the furcation body 112 for inserting the assembly through a grommet, seal, or the like and into an enclosure.

Figure 11:
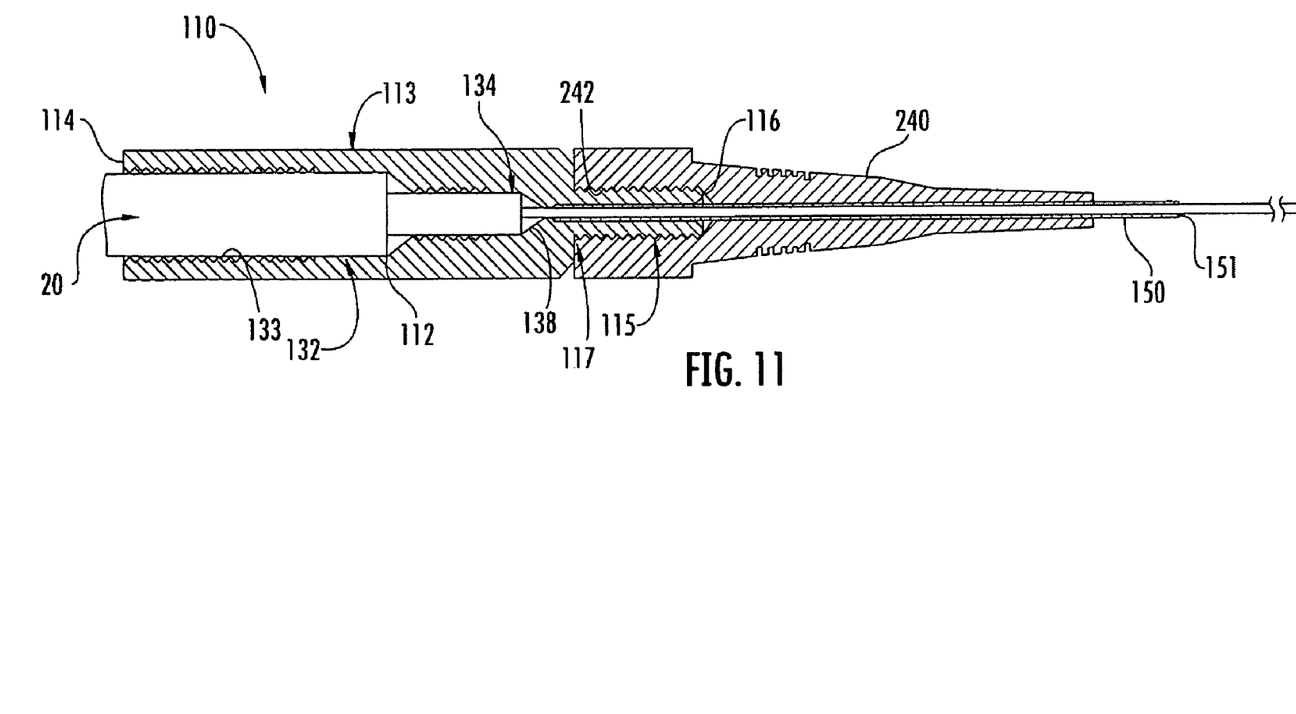
FIG. 11 depicts the furcation assembly secured to the fiber optic cable by threading the furcation member onto the drop cable jacket.

FIG. 11 depicts furcation assembly 100 with fiber 40 passing through the furcation body and extending beyond the end 151 of the furcation tube 150. Next, attaching furcation body 112 to drop cable 10 is accomplished by inserting the fiber optic cable end into the front section 132 of the channel and pushing and/or twisting the furcation body 112 to attach the same to unbuffered drop cable 10. Note that since cable jacket 20 has a general elliptical or oval shape (FIG. 3), the attachment grooves only engage a portion of the cable jacket at and/or near major axis $A_1$. Fiber 40, which passes through channel back section 134 and guide 150, stays stationary relative to furcation body 112. In other words, the furcation body rotates around the fiber as the furcation body is twisted onto the unbuffered drop cable. At this point, a portion of fiber 40 extends beyond protection member back end 181. In an example embodiment, this exposed fiber portion has a length of about 20 centimeters.

Figure 12:
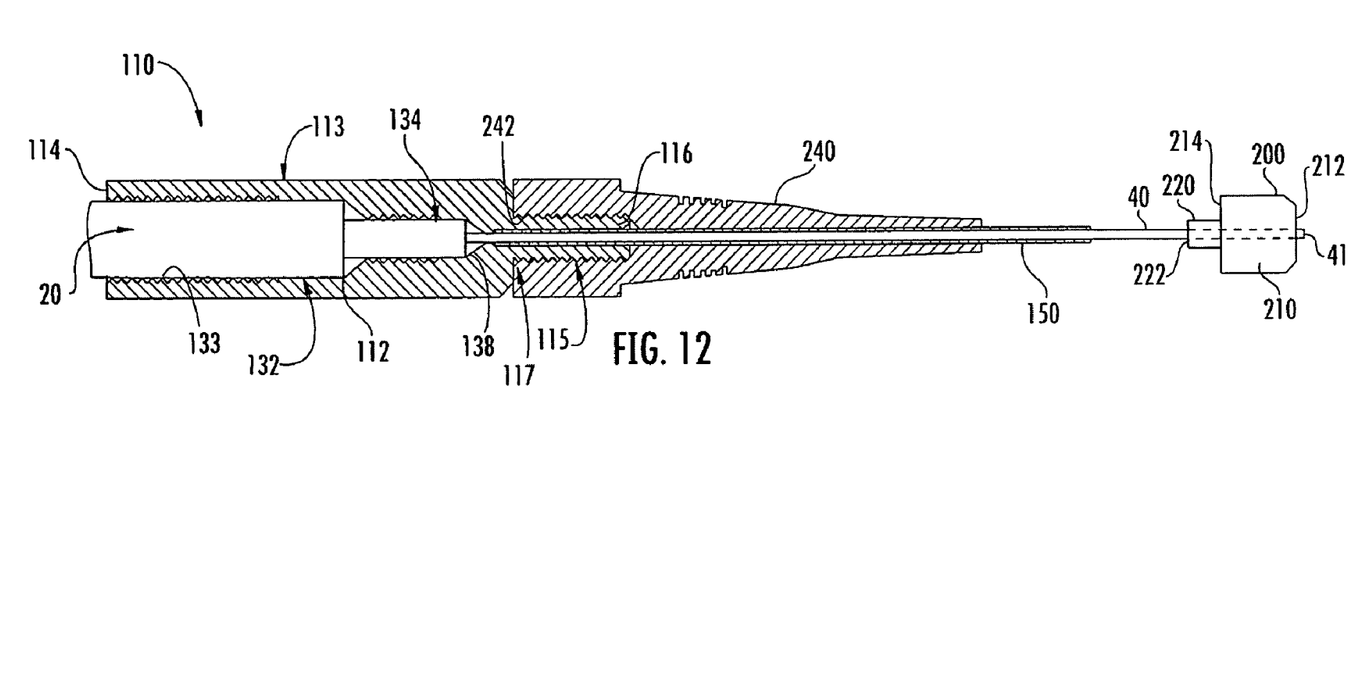
FIG. 12 is a schematic side view showing the furcation assembly of FIG. 11 with a fiber optic connector attached.

FIG. 12 shows an exposed portion of fiber 40 is prepared (e.g., stripped and cleaved) for installation (i.e., "connectorization") into an optical fiber connector 200 as discussed above. Like before, prior to attaching connector 200, a bend-limiting connector boot 240 may be slid over furcation tube 150 in anticipation of connecting the boot to connector housing back end 214. At this point, fiber 40 is connectorized with a connector 200. Of course, the concepts for furcation bodies and furcation assemblies disclosed herein can include variations.

Figure 13A:
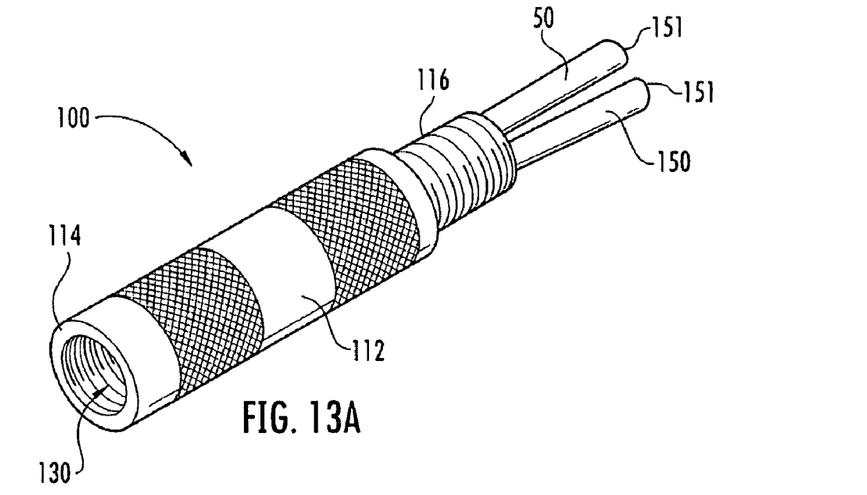
FIGS. 13A and 13B respectively are a perspective view and a cross-sectional view of an explanatory furcation body suitable for fiber optic cables having multiple fibers.
Figure 13B:
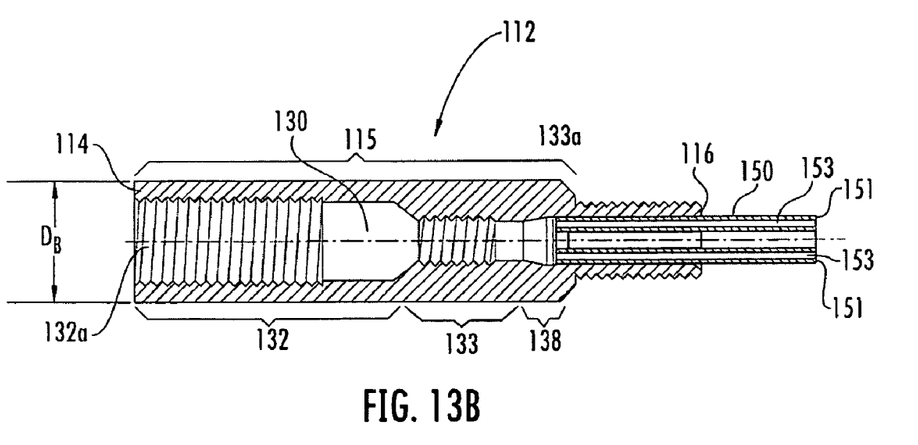

Illustratively, in applications where fiber optic drop cable 10 (buffered or unbuffered) carries more than one optical fiber 40, a multifiber furcation assembly 100 may be used to furcate the same. FIG. 13A is a perspective view and FIG. 13B is a lengthwise cross-sectional view of an explanatory multifiber furcation assembly 100 intended for use with a buffered drop cable 10 with a buffer tube 30 that carries multiple fibers 40. Multifiber furcation assembly 100 is similar to the single-fiber version, except that furcation body 112 is configured to accommodate two or more furcation tubes 150. For instance, the furcation body 112 includes two or more back sections 134 in the channel that each accommodate respective end portions of respective furcation tubes 150. The method of furcating a buffered drop cable 10 using a multifiber furcation assembly 10 such as shown FIGS. 18A and 18B is similar to the single-fiber furcation assembly, except that the different fibers 40 are fed into different furcation tubes 150 and may be separately connectorized in the manner described above. Additionally, since multiple furcation tubes are used the furcation body should not be twisted onto the fiber optic cable; instead, the furcation body should be pushed onto attachment grooves. For buffered drop cables 10 that included multiple buffer tubes 30, each buffer tube is furcated within the furcation assembly.

The furcation bodies and furcation assemblies disclosed along with the corresponding methods have a number of advantages. First, the furcation body is suitable for use with several different fiber optic cable sizes and/or constructions. Additionally, installation is simple, quick and efficient since it does not require any special tools or materials beyond those normally provided with a connector installation kit. In addition, connectors 200 specifically designed for use with 250 μm fibers 40 can be easily installed, which provides for improved mechanical robustness of the drop cable and connection. This is especially true for field-connectorization where it is desired to tailor the cable assembly length for the installation or where one end of the cable must pass through a small opening or duct before installing a connector. In addition, the tedious step of threading a long, small-diameter tubing onto a long section of exposed fiber is eliminated.

It will be apparent to those skilled in the art that various modifications and variations can be made without departing from the spirit and scope of the invention. Thus, it is intended that the present invention cover the modifications and variations provided they come within the scope of the appended claims and their equivalents.

What is claimed is:

1. A furcation body for furcating a fiber optic cable, comprising:
a channel forming a passageway extending from a front end to a back end of the furcation body, wherein the channel includes a front section and a back section, the front section includes one or more attachment grooves suitable for securing the furcation body to a portion of the fiber optic cable, and the back section of channel sized for receiving a furcation tube, wherein the back end of the furcation body has an external threaded portion.

2. The furcation body of claim 1, wherein the channel has a medial section that includes one or more attachment grooves, wherein the medial section is smaller than the front section of the channel.

3. The furcation body of claim 1, further including an extension having an internal threaded portion that cooperates with the external threaded portion on the back end of the furcation body.

4. The furcation body of claim 1, wherein the furcation body is a portion of a furcation assembly that includes a fiber optic cable.

5. The furcation body of claim 4, wherein the channel has a medial section that includes one or more attachment grooves, wherein the medial section is smaller than the front section of the channel.

6. The furcation body of claim 4, wherein the assembly can withstand a pullout force of about 75 Newtons.

7. The furcation body of claim 4, wherein the furcation body is attached to the fiber optic cable without the use of an adhesive or crimp.

8. The furcation body of claim 4, wherein the assembly includes at least one fiber optic connector.

9. The furcation body of claim 4, wherein the fiber optic cable has a non-round cross-section.

10. The furcation body of claim 4, wherein the assembly includes one or more furcation tubes.

11. The furcation body of claim 1, wherein the furcation body has one or more bores that lead to the channel.

12. A furcation body for furcating a fiber optic cable, comprising:

a channel forming a passageway extending from a front end to a back end of the furcation body, wherein the channel includes a front section, a medial section, and a back section, the front section includes one or more attachment grooves suitable for securing the furcation body to a portion of the fiber optic cable, and the medial section being smaller than the front section of the channel and including one or more attachment grooves.

13. The furcation body of claim 12, the back end of the furcation body having an external threaded portion.

14. The furcation body of claim 13, further including an extension having an internal threaded portion that cooperates with the external threaded portion on the back end of the furcation body.

15. The furcation body of claim 12, wherein the furcation body is a portion of a furcation assembly that includes a fiber optic cable.

16. The furcation body of claim 15, wherein the furcation body has one or more bores therein for injecting an adhesive into the furcation body.

17. The furcation body of claim 15, wherein the assembly can withstand a pullout force of about 75 Newtons.

18. The furcation body of claim 15, wherein the furcation body is attached to the fiber optic cable without the use of an adhesive or crimp.

19. The furcation body of claim 15, wherein the assembly includes at least one fiber optic connector.

20. The furcation body of claim 15, wherein the fiber optic cable has a non-round cross-section.

21. The furcation body of claim 15, wherein the assembly includes one or more furcation tubes.

22. The furcation body of claim 12, wherein the furcation body has one or more bores that lead to the channel.

23. A fiber optic cable assembly, comprising:
a furcation body having a channel forming a passageway extending from a front end to a back end of the furcation body, wherein the channel includes a front section, a medial section, and a back section, the front section includes one or more attachment grooves suitable for securing the furcation body to a portion of the fiber optic cable, and the medial section being smaller than the front section of the channel and including one or more attachment grooves;
a fiber optic cable being attached to the furcation body; and
at least one fiber optic connector.

24. The furcation body of claim 23, wherein the furcation body has one or more bores therein for injecting an adhesive into the furcation body.

25. The furcation body of claim 23, wherein the assembly can withstand a pullout force of about 75 Newtons.

26. The furcation body of claim 23, wherein the furcation body is attached to the fiber optic cable without the use of an adhesive or crimp.

27. The furcation body of claim 23, wherein the fiber optic cable has a non-round cross-section.

28. The furcation body of claim 23, wherein the furcation body has one or more bores that lead to the channel.

\* \* \* \* \*